May 30, 1950     H. TRUAX     2,509,543
CONVEYER
Filed Aug. 12, 1946
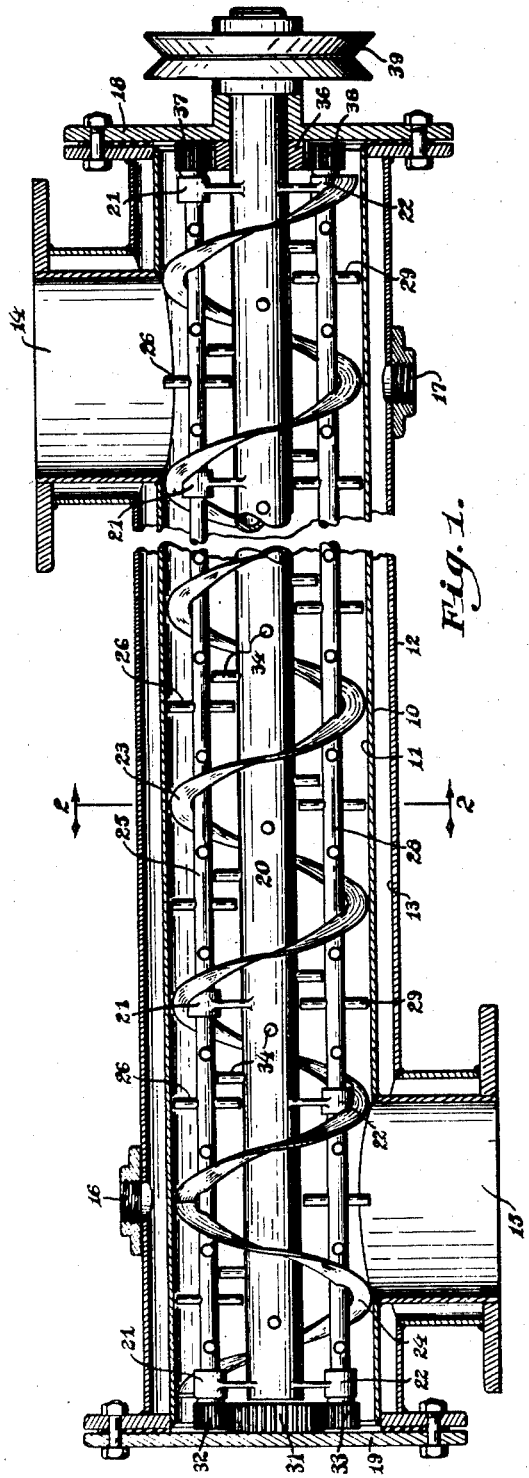
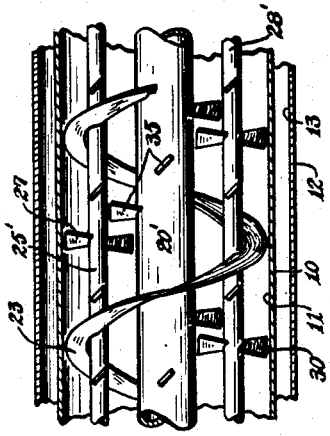
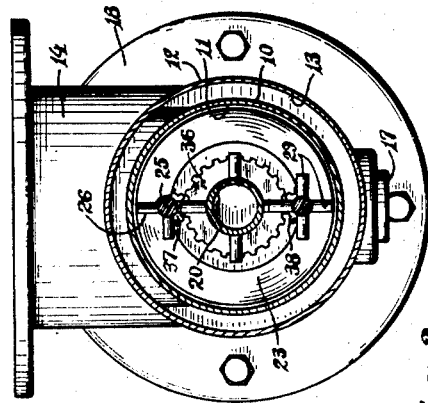
INVENTOR.
HARRY TRUAX,
BY: Harold B. Hood.
ATTORNEY.

Patented May 30, 1950

2,509,543

UNITED STATES PATENT OFFICE 2,509,543

CONVEYER

Harry Truax, Indianapolis, Ind., assignor to Indiana Farm Bureau Co-Operative Association, Inc., Indianapolis, Ind., a corporation of Indiana Application August 12, 1946, Serial No. 689,838

2 Claims. (Cl. 259—6)

The object of the present invention is to provide an improved conveyor structure, particularly adapted to the moving of materials which are likely to become gummy or to harden in the conveyor tube. The invention is particularly useful in connection with the movement of such materials through a treating chamber; and an outstanding feature of the invention is the provision of means designed to agitate the material as it moves through the conveyor tube and to prevent the building up of gummy masses adhering to the rotor within the tube.

More specifically, my invention finds a high degree of utility in the commercial process of dry-ign soy bean flakes. According to standard practice, the flaked material, after extraction of the oil therefrom, is delivered to a steam jacketed treatment chamber which comprises an elongated tube with a screw conveyor flight mounted therein. Operation of the conveyor flight is intended to carry the flaked material from the inlet of said chamber, adjacent one end thereof, to the outlet adjacent the opposite end thereof; and, in practice, the material is so transported and is delivered from the outlet of the chamber, in a reasonably satisfactory manner for periods sometimes as long as several days.

However, occasionally, for a reason which is not known to me, a small portion of the material moving through the chamber will adhere to the conveyor flight or to its shaft; and then, within a relatively short period, a "snowball effect" arises to build up on the conveyor rotor a large and gummy mass of material which will ultimately block the entire chamber, and which is rooted on the rotor shaft.

The treatment chamber is steam jacketed and is held at a relatively high temperature. The cellulosic material here primarily under consideration, actually cooks in the chamber, when it is held therein for long periods; and the above-mentioned mass changes in character, as a result of the "cooking" until it becomes almost rock hard. Frequently, the attendant fails to note that the conveyor is becoming blocked, until the adherent mass has built up substantially to fill the chamber. It has been found in practice that, once this condition arises, it is substantially impossible to clear the treatment chamber except by withdrawing the conveyor flight completely from the chamber; and that is not only an arduous and time-consuming task, but one which, because of the extreme hardness of the cooked cellulosic mass, almost invariably results in serious damage to the chamber, the conveyor flight, or both.

It is, then, the primary object of the present invention to provide a structure of such character as to prevent the growth of masses of material adhering to the conveyor rotor, in such an organization. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a longitudinal section through a conveyor or treatment mechanism constructed in accordance with the present invention;

Fig. 2 is a transverse section therethrough taken substantially on the line 2—2 of Fig. 1; and Fig. 3 is a fragmentary longitudinal section showing a modification.

Referring more particularly to the drawings, it will be seen that I have illustrated a conveyor unit comprising an elongated tube 10 defining a treatment chamber 11, said tube being surrounded by a jacket 12, whereby a steam chamber 13 is defined between said tube and said jacket. The tube 10 is formed with an inlet 14 adjacent one end thereof and with an outlet 15 adjacent the opposite end thereof. Similarly, the steam chamber is provided with an inlet 16 near the discharge end of the tube 10 and with an outlet 17 near the inlet end of said tube.

In the illustrated embodiment of my invention, one end of the unit is closed by a head 18, suitably secured to the tube 10 and its jacket, while the other end thereof is closed by a similar head 19. Journalled in a suitable bearing in the head 18 is a rotor or hollow shaft 20 formed to provide a plurality of bearing elements 21 projecting radially therefrom and disposed upon a common axis parallel with the axis of said rotor 20. A second series of bearing elements 22 projects radially from the rotor 20 in a diametrically opposite direction, all of said bearings 22 being disposed upon a common axis parallel with the axis of the rotor 20. Suitably supported from the rotor, and preferably upon the bearing elements 21 and 22, is a ribbon-type conveyor flight 23, spaced throughout its length from the periphery of the rotor 20, and having an external periphery only slightly smaller than the internal periphery of the chamber 11, whereby the conveyor unit, journalled only at the inlet end of the chamber, is supported throughout its length by the chamber wall, through the conveyor flight. Preferably, that portion 24 of the conveyor flight located between the centerline of the outlet 15 and the adjacent end of the chamber is of reverse pitch relative to the main body of said conveyor flight.

Journalled in the bearing elements 21 is an auxiliary shaft 25 provided, along its length, with axially and peripherally spaced agitator fingers 26, the length of said fingers being only slightly less than the distance between the outer peripheries of the rotor 20 and the shaft 25. It will be seen that the latter distance is substantially equal to the distance between the periphery of the shaft 25 and the internal surface of the tube 10. A similar auxiliary shaft 28 is similarly journalled in the bearing elements 22 and is provided with similar agitator fingers 29, similarly arranged thereon.

Mounted upon the end wall 19 in a suitable fashion and held against rotation with respect thereto, is a gear 31, concentric with the rotor 20; and a gear 32, mounted on the shaft 25, and a gear 33, mounted on the shaft 28, are located in meshing engagement with said gear 31. It will be seen that, as the rotor 20 turns, the shafts 25 and 28 will be carried through a path concentric with the axis of said rotor 20, whereby said gears 32 and 33 will be moved around the gear 31, and the shafts 25 and 28 will thereby be rotated about their own axes. The rotor 20 is preferably provided with a series of agitator fingers 34 axially spaced relative to the fingers 26 and 29, the length of said fingers 34 being substantially equal to the distance between the outer peripheries of the rotor 20 and the shafts 25 and 28. Preferably, but not necessarily, a gear 36 similar to the gear 31 will be similarly mounted upon the wall 18, in which case gears 37 and 38, similar to the gears 32 and 33, will be mounted on the shafts 25 and 28 to mesh with the stationary gear 36.

For driving the rotor 20, I have illustrated an outboard pulley 39.

As the shaft 20 is rotated to actuate the conveyor flight 23, the shafts 25 and 28 will planetate about the rotor 20, and the agitator fingers 26, 29 and 34 will coact with each other and with said rotor to prevent the accumulation of any material quantity of the substance, carried through the unit, in adhering engagement upon the rotor 20. It is my present belief that, with the illustrated structure, there will never be such an accumulation of material upon the rotor as will even partially block the movement of material through the unit.

To my surprise, I have discovered that the provision of the disclosed structure not only accomplishes the intended function of preventing caking and clogging of the unit, but very materially improves the drying effect of the equipment. Commercial use of the equipment of the present disclosure has demonstrated the fact that, presumably due to the extreme degree of agitation of material within the treatment chamber, processing effects which previously required forty minutes to accomplish can now be accomplished in seventeen minutes.

In Fig. 3, I have illustrated an arrangement of agitating fingers which may have considerable operative advantage over that disclosed in Fig. 1, in connection with certain materials. According to Fig. 3, paddles 27, arranged on the shaft 25' in spiral relation, and given a pitch in the proper direction, as shown, actually assist in the transportation of the material being treated, through the treatment chamber. Similarly, paddles 30 similarly arranged on the shaft 28' and paddles 35 similarly arranged on the rotor 20', may add to the efficiency of the equipment.

I claim as my invention:

1. In combination, an elongated chamber having an inlet adjacent one end and an outlet adjacent its opposite end, a main shaft coaxially journalled for rotation within said chamber and extending continuously from end to end thereof, means projecting radially from said shaft at a plurality of points spaced along its length, said means providing a plurality of aligned bearings, an auxiliary shaft journalled in said bearings, a conveyor flight having a plurality of turns concentric with said main shaft mounted to rotate therewith extending substantially from end to end of said chamber and substantially engaging the internal wall thereof, agitator means located between turns of said flight carried by said auxiliary shaft and extending substantially into contact with said main shaft and the internal wall of said chamber, and means for rotating said main shaft and said auxiliary shaft about the axis of said main shaft while rotating said auxiliary shaft about its own axis.

2. In combination, an elongated chamber having an inlet adjacent one end and an outlet adjacent its opposite end, a main shaft journalled for rotation within said chamber and extending continuously from end to end thereof, aligned bearings projecting radially from said shaft adjacent its opposite ends and at a plurality of points intermediate said ends, an auxiliary shaft journalled in said bearings, a ribbon type conveyor flight having a plurality of turns respectively supported upon said radially projecting bearings and located entirely radially beyond said auxiliary shaft, said flight extending substantially from end to end of said chamber, agitator means projecting substantially radially from said auxiliary shaft and substantially into contact with said main shaft and the internal wall of said chamber, and means for rotating said main shaft and said auxiliary shaft about the axis of said main shaft while rotating said auxiliary shaft about its own axis.

HARRY TRUAX.

REFERENCES CITED

The following references are of record in the file of this patent:

UNITED STATES PATENTS

| Number | Name | Date |
|---|---|---|
| 227,396 | Tregurtha | May 11, 1890 |
| 901,465 | Pancoast | Oct. 20, 1908 |
| 1,013,612 | Peters | Jan. 2, 1912 |
| 1,356,296 | La Casse | Oct. 19, 1920 |
| 1,612,281 | Goetz | Dec. 28, 1926 |
| 1,752,582 | Taylor | Apr. 1, 1930 |
| 1,880,731 | Boileau | Oct. 4, 1932 |